Feb. 8, 1938. S. F. GLEASON 2,107,329
MEAT PROCESSING AND MOLDING DEVICE
Original Filed Jan. 13, 1936 2 Sheets-Sheet 1

INVENTOR
STANLEY F. GLEASON
BY
ATTORNEY

Feb. 8, 1938.   S. F. GLEASON   2,107,329
MEAT PROCESSING AND MOLDING DEVICE
Original Filed Jan. 13, 1936   2 Sheets-Sheet 2

INVENTOR
STANLEY F. GLEASON
BY
ATTORNEY

Patented Feb. 8, 1938

2,107,329

UNITED STATES PATENT OFFICE 2,107,329

MEAT PROCESSING AND MOLDING DEVICE

Stanley F. Gleason, Philadelphia, Pa.

Application January 13, 1936, Serial No. 58,880
Renewed August 12, 1937

3 Claims. (Cl. 100—57)

My invention relates to a new and useful meat processing and molding device of the type employed in the packing industry for cooking and molding boned meat, such as hams, legs of lamb, etc.

My invention further relates to a device of this character which is of an extremely simplified construction, thereby greatly reducing the cost of manufacture and greatly facilitating the cleaning of the apparatus in conformity with the rigid requirements of the laws governing the packing in the meat processing industry.

My invention still further relates to a device of this character which is adapted automatically to exert an equalized and constantly self-equalizing pressure on the meat being cooked and molded, thereby insuring uniformity of product without the necessity of any attention on the part of the operator after the apparatus is once adjusted and placed in the cooking vat.

My invention still further relates to a device of this character which employs a novel arrangement of co-acting, elliptical, leaf springs, whereby effective following pressure is exerted constantly on the meat being cooked and molded.

Other features of novelty and advantage will be more clearly understood from the following specification and the accompanying drawings in which.

Figure 1:
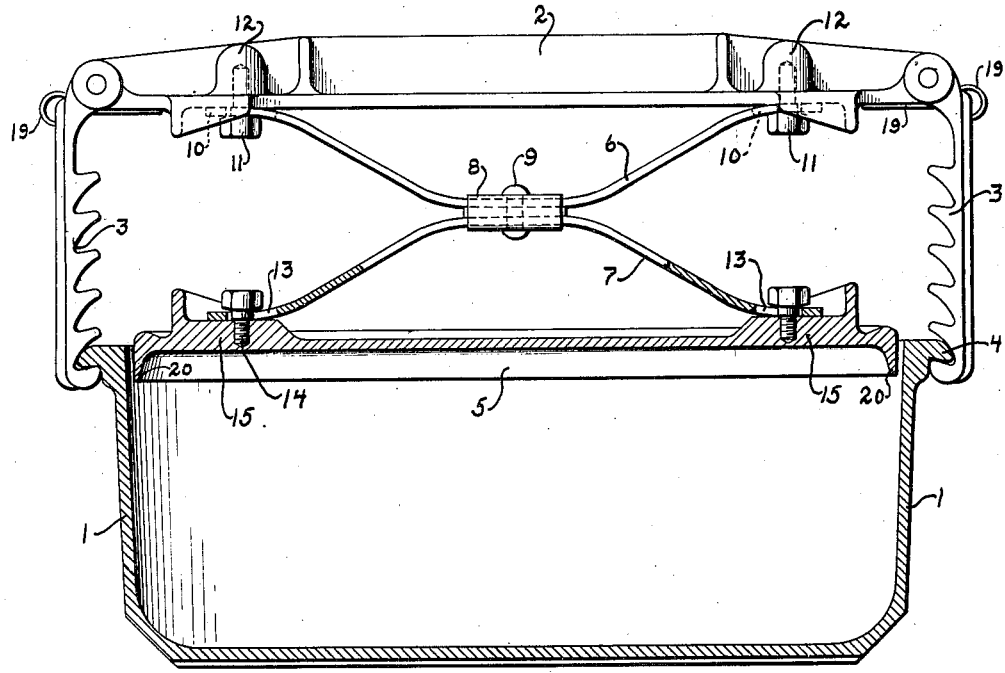
Fig. 1 represents a view partly in vertical section and partly in elevation showing a meat processing and molding device embodying my invention, the same being shown in the "open" or uncompressed position.

Referring to the drawings in which like reference characters designate like parts, I designates a container which serves as a mold which may be of any desired shape or size according to the shape or size to be imparted to the meat to be processed. 2 designates a cross-bar to the ends of which are pivoted the ratchet members 3, said ratchet members 3 being adapted to engage the flange 4 formed at the upper rim of the mold 1. 5 designates a follower plate or plunger which is adapted to compress the meat positioned within the container.

In order to provide easily constructed and assembled and easily operated and easily cleansed means for pressing the plunger 5 on the meat within the mold 1, I employ the oppositely disposed, substantially elliptical leaf springs 6 and 7 which are secured together at their central portions by means of the sleeve or bracket 8 and bolt or rivet 9 with the free ends of the spring 6 provided with the slots 10 through which pass the bolts 11 which are threaded into the bosses 12 in the cross-bar 2. Similarly, the free ends of the leaf spring 7 are provided with the slots 13 through which pass the bolts 14 which threadedly engage the plunger 5, as at 15. The slots 10 and 13 afford necessary play, or leeway for movement of the leaf springs 6 and 7 from their uncollapsed position, as shown in Fig. 1, to their collapsed position, as shown in Fig. 2.

Figure 2:
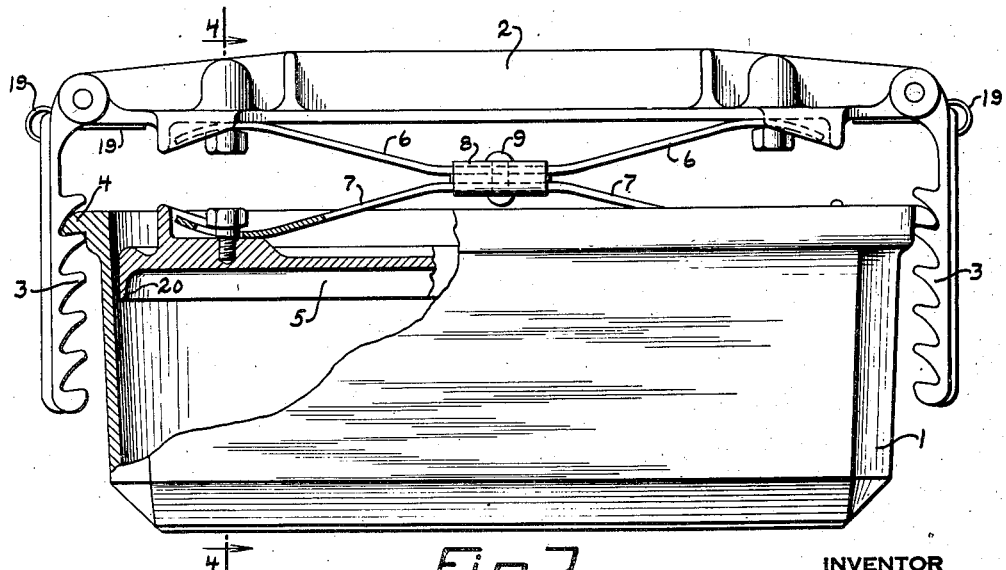
Fig. 2 represents a view similar to Fig. 1 showing the device in its "closed" or compressed position.
Figure 3:
Fig. 3 represents a fragmentary plan view of the end of one of the springs.
Figure 5:
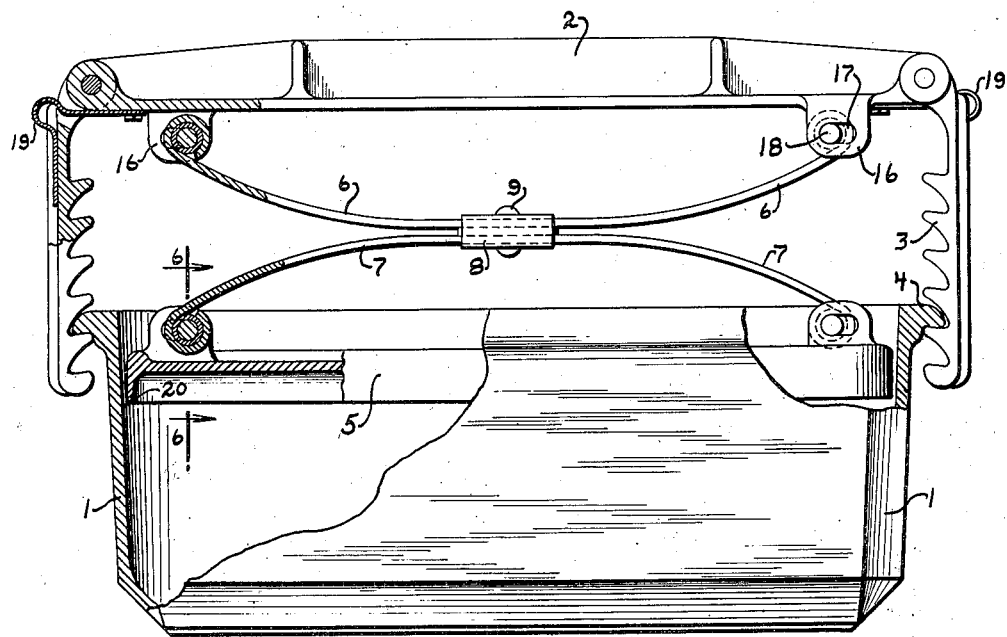
Fig. 5 represents a view similar to Fig. 2 showing a modified form of construction.

In Fig. 5 I have shown a modified form of construction which is identical in construction with the showing of Figs. 1 and 2 except that in the construction shown in Fig. 5 the cross-bar 2, and the plunger 5, are provided with the ears 16 which have formed therein the slots 17 in which the pins 18 are free to move, the free ends of the leaf springs 6 and 7 being in this construction secured to the pins 18, as clearly illustrated.

If desired, a spring element 19 is suitably associated with the ends of the cross-bar 2 and positioned so as to bear against the ratchet elements 3, thus serving to keep such ratchet elements constantly tensioned against the mold 1 to guard against accidental disengagement of either of said ratchet elements from the flange or lug 4 of the mold 1. Similarly, if desired, the follower plate 5 may be provided with the pendant flange 20, which, when the plunger 5 is pressed downwardly upon the meat in the mold 1, will engage or bear against the inner wall of the mold 1 thus preventing against undue tilting or unbalancing of the plunger 5 under conditions of abnormal pressure.

Figure 4:
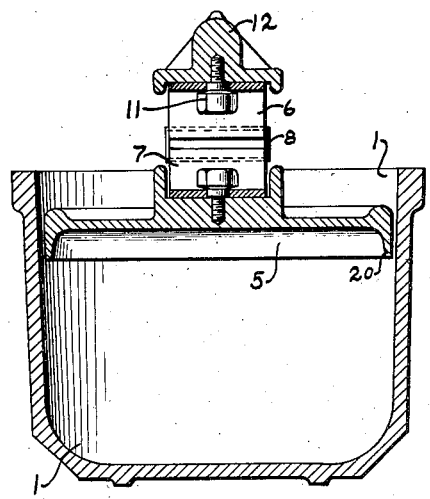
Fig. 4 represents a section on line 4—4 of Fig. 2.
Figure 6:
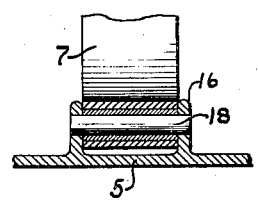
Fig. 6 represents a section on line 6—6 of Fig. 5.

From Figs. 1, 2, and 4 it will be seen that the ends of the springs 6 and 7, where they extend beyond the retaining bolts 11, repose and are confined within pockets formed at either end of and in the under side of the cross bar 2, and in the upper side and at either end of the pressure plate 5, which pockets serve as guides and also serve as lateral and longitudinal stops in the event that one of said retaining bolts is sheared under excessive pressure or due to fatigue.

It will also be noted that according to my novel construction the springs 6 and 7 are permitted to slide freely within a limited range so as to permit of adjustment according to variation in the size of the ham to be processed or molded and, at the same time, to limit the range of movement so that adequate compression is exerted at all points at all times. My novel springs, being secured together at about their center at 9 and having a limit to their movements at their ends and being oppositely deflected, are able to afford an interplay in the lines of force so that the pressure exerted on the bar 2 is transmitted indirectly through the medium of the spring 6 to the bottom of the spring 7, the assembly being such that pressure is transmitted vertically, horizontally and diagonally by means of which a uniformity of pressure, regardless of the non-uniformity of the product to be molded, is attained thus resulting in a constantly self-equalizing, balancing pressure which produces a much desired evenness and homogeneity in the ham.

Having thus described my invention, what I claim as new and desire to secure by Letters Patent is:

1. In a meat processing and molding device comprising a mold, a pressure plate adapted to move therein, a cross bar adapted to straddle said mold, and means carried by said cross bar for adjustably engaging the latter with said mold, a pair of leaf-springs secured centrally to each other, the ends of one of said springs being adapted to be secured to said cross bar, and the ends of the other of said springs being adapted to be secured to said pressure plate, said pair of leaf-springs constituting means for adjustably engaging said cross bar and said pressure plate and for applying pressure to said pressure plate.

2. A meat processing and molding device comprising a mold, a pressure plate adapted to move therein, said pressure plate having pockets on the upper side thereof, a cross bar, means for adjustably securing said cross bar to said mold, said cross bar having pockets on the under side thereof, means carried by said cross bar for adjustably engaging it and said pressure plate comprising a pair of leaf-springs secured centrally to each other with the ends of said springs reposing in said pockets and having sliding engagement therewith, there being slots formed adjacent the ends of said springs, and fastening means extending through said slots for securing said springs to said pressure plate and said cross bar, whereby the walls of said pockets will act as stops for said springs in the event of failure of said fastening means.

3. In a meat processing and molding device comprising a mold, a pressure plate adapted to move therein, a cross bar adapted to straddle said mold, and means carried by said cross bar for adjustable engagement with said mold, a pair of leaf-springs secured centrally to each other, the ends of one of said springs being adapted to be secured to said cross bar, and the ends of the other of said springs being adapted to be secured to said pressure plate, said pair of leaf-springs constituting means for adjustable engagement with and adapted to apply pressure to said pressure plate.

STANLEY F. GLEASON.